(12) United States Patent
Mizutani

(10) Patent No.: US 7,539,897 B2
(45) Date of Patent: May 26, 2009

(54) FAULT TOLERANT SYSTEM AND CONTROLLER, ACCESS CONTROL METHOD, AND CONTROL PROGRAM USED IN THE FAULT TOLERANT SYSTEM

(75) Inventor: Fumitoshi Mizutani, Tokyo (JP)

(73) Assignee: NEC Corporation, Tokyo (JP)

( * ) Notice: Subject to any disclaimer, the term of this patent is extended or adjusted under 35 U.S.C. 154(b) by 490 days.

(21) Appl. No.: 11/311,151

(22) Filed: Dec. 20, 2005

(65) Prior Publication Data

US 2006/0149986 A1    Jul. 6, 2006

(30) Foreign Application Priority Data

Dec. 21, 2004    (JP) ............... 2004-369379

(51) Int. Cl.
*G06F 11/00* (2006.01)
(52) U.S. Cl. ............... 714/11; 714/12; 714/13
(58) Field of Classification Search .............. 714/11–13
See application file for complete search history.

(56) References Cited

U.S. PATENT DOCUMENTS

| | | | | |
|---|---|---|---|---|
| 5,163,148 | A | * | 11/1992 | Walls .................... 707/204 |
| 5,751,932 | A | | 5/1998 | Horst et al. |
| 5,838,894 | A | * | 11/1998 | Horst .................... 714/11 |
| 5,953,742 | A | | 9/1999 | Williams |
| 6,157,967 | A | * | 12/2000 | Horst et al. .................... 710/19 |
| 6,279,119 | B1 | | 8/2001 | Bissett et al. |
| 6,473,869 | B2 | | 10/2002 | Bissett et al. |
| 2002/0152418 | A1 | | 10/2002 | Griffin et al. |
| 2002/0152419 | A1 | | 10/2002 | McLoughlin et al. |
| 2004/0153756 | A1 | * | 8/2004 | Tsukahara .................... 714/13 |
| 2004/0208130 | A1 | | 10/2004 | Mizutani et al. |
| 2004/0221195 | A1 | | 11/2004 | Mizutani et al. |
| 2006/0149986 | A1 | * | 7/2006 | Mizutani .................... 713/375 |

FOREIGN PATENT DOCUMENTS

| | | |
|---|---|---|
| JP | 2000-298594 A | 10/2000 |
| JP | 2001-523855 A | 11/2001 |
| JP | 2004-318702 A | 11/2004 |
| JP | 2004-326151 A | 11/2004 |

* cited by examiner

*Primary Examiner*—Emerson Puente
(74) *Attorney, Agent, or Firm*—Foley & Lardner LLP

(57) ABSTRACT

The present invention has been made to realize access processing performed in accordance with synchronous/asynchronous state between processors in a fault tolerant system. In two systems that constitute a fault tolerant system, a router assigns, to an access packet transmitted from a CPU to an IO device, tag information including ID codes of access source and destination and information indicating whether the access packet is synchronous access. An access comparison section has buffers and that retain the packets from the CPU on a system basis, a tag check section that determines whether each packet is synchronous packet access based on the tag information assigned to the packets retained in the buffers, and a comparison section that outputs the packet from one system to an IO IF and discards the packet from other system in the case where the packet is synchronous access.

8 Claims, 7 Drawing Sheets

FIG.6

| STATE INFORMATION | CPU OF #0 SYSTEM | CPU OF #1 SYSTEM |
|---|---|---|
| SYNCHRONOUS STATE | Source ID = Sync CPU | Source ID = Sync CPU |
| ASYNCHRONOUS STATE | Source ID = CPU 0 | Source ID = CPU 1 |

(EXAMPLE OF SOURCE ID CODE
WITH SYNCHRONIZATION INFORMATION IN TAG)

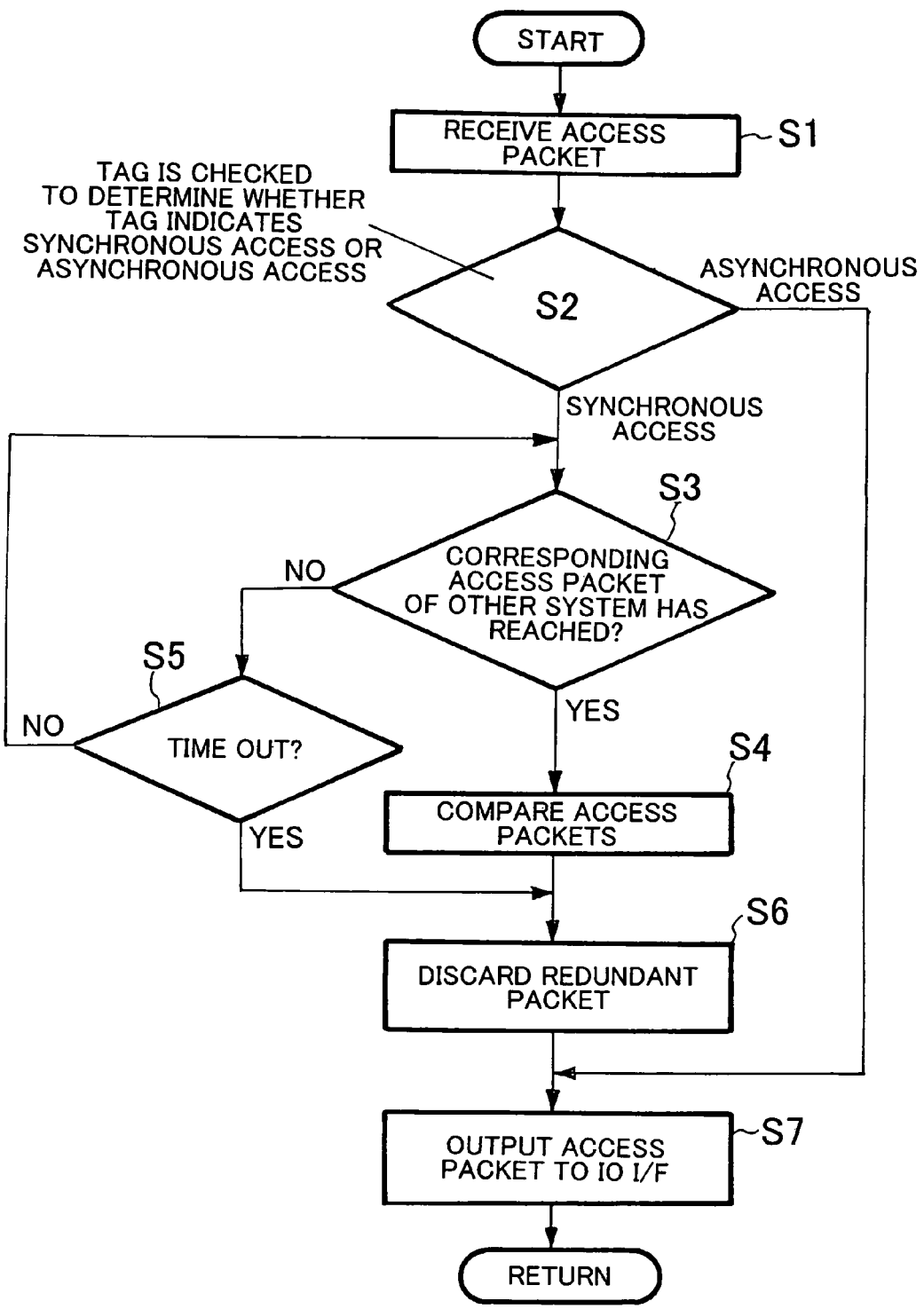

FAULT TOLERANT SYSTEM AND CONTROLLER, ACCESS CONTROL METHOD, AND CONTROL PROGRAM USED IN THE FAULT TOLERANT SYSTEM

BACKGROUND OF THE INVENTION

1. Field of the Invention

The present invention relates to a fault tolerant system and controller, access control method, and control program used in the fault tolerant system and, more particularly, to an access control from a processor to an IO device for realizing a fault tolerant configuration in a computer system.

2. Description of the Related Art

Conventionally known is a fault tolerance computer system (hereinafter, referred to as "fault tolerance system") in which all components, such as a CPU (Central Processing Unit), memory, PCI (Peripheral Component Interconnect), disk, power source, and the like, that constitute a computer hardware are multiplexed (for example, duplicated or triplicated). In such a computer system, even if a failure occurs in any of components, the system can continue operating without interruption.

In the fault tolerant system, a multiplexed plurality of CPUs (processors) executes the same operation at the same timing while constantly establishing synchronization between them (which is referred to as "lock-step synchronization"). Even if a failure occurs in one of the plurality of CPUs that execute the same operation in lock-step synchronization, other CPUs continue normal operation. That is, if any failure occurs, the fault tolerant system can continue operating without adversely affecting the operation of software such as an operating system or application software executed by the CPU.

As related arts concerning such a fault tolerant system, U.S. patent application publication No. 2002/0152418 A1 discloses an apparatus and method for executing instructions in lock-step synchronization, U.S. patent application publication No. 2002/0152419 A1 discloses an apparatus and method for accessing a mass storage device in a fault-tolerant server, U.S. Pat. No. 5,953,742 discloses a technique of making a memory copy between a plurality of processing sets each including a processor that operates in lock-step synchronization to establish high-speed resynchronization, and U.S. Pat. No. 5,751,932 discloses a configuration including routers belonging to two systems between which CPUs process the same instruction in lock-step synchronization, the routers routing packets to not only the CPU and an IO device of its own system but also those in other system.

It is required for the above fault tolerant system to process accesses issued from a plurality of CPUs as individual accesses when the CPUs are in an asynchronous state and to process accesses issued from the CPUs as common accesses when the CPUs are in a lock-step synchronous state. The above-related arts, however, have not been made in view of the access processing performed in accordance with synchronous/asynchronous state between the CPUs.

SUMMARY OF THE INVENTION

The present invention has been made in view of the above situation, and an object thereof is to realize access processing performed in accordance with synchronous/asynchronous state between processors in a fault tolerant system.

To achieve the above object, according to the present invention, there is provided a fault tolerant system including a plurality of systems constituted by the same computer hardware components, each of the systems comprising: a processor section that can operate in a lock-step synchronous state between own system and other system; an input/output section to be connected to the processor section; a controller to be connected between the processor section and input/output section; and a signal transmission path that connects the own system and other system through the controller, the controller comprising: tag assignation means for assigning tag information to access data that are transmitted from the processor section to the input/output section, the tag information including: identifying information of the access source and destination; and synchronization information indicating whether the access data is synchronous access data that has been issued when the processor section is in a lock-step synchronous state; buffer means for separately retaining the access data of the own system and other system that are transmitted from the processor section; synchronization determination means for determining whether the access data is synchronous access data based on the tag information assigned to the access data in the buffer means; and processing means for outputting the access data from one of the plurality of systems to the input/output section and discarding the access data from other systems in the case where the access data is synchronous access data.

In the present invention, the tag information may include determination information indicating whether the access data is synchronous access data. The determination information may be combined with the identification information of the access source, and be set such that the identification information of the access source apparently becomes the same when the access data is synchronous access data, whereas the identification information of the access source are individually set when the access data is not synchronous access data.

According to the present invention, there is provided a controller used in a fault tolerant system including a plurality of systems constituted by the same processor section and input/output section, the controller comprising: tag assignation means for assigning tag information to access data that are transmitted from the processor section to the input/output section, the tag information including: identifying information of the access source and destination; and synchronization information indicating whether the access data is synchronous access data that has been issued when the processor section is in a lock-step synchronous state; buffer means for separately retaining the access data of the own system and other system that are transmitted from the processor section; synchronization determination means for determining whether the access data is synchronous access data based on the tag information assigned to the access data in the buffer means; and processing means for outputting the access data from one of the plurality of systems to the input/output section and discarding the access data from other systems in the case where the access data is synchronous access data.

According to the present invention, there is provided an access control method used in a fault tolerant system including a plurality of systems constituted by the same processor section and input/output section, the access control method comprising the steps of: assigning tag information to access data that are transmitted from the processor section to the input/output section, the tag information including: identifying information of the access source and destination; and synchronization information indicating whether the access data is synchronous access data that has been issued when the processor section is in a lock-step synchronous state; separately retaining the access data of the own system and other system that are transmitted from the processor section; determining whether the access data is synchronous access data based on the tag information assigned to the access data in the buffer means; and outputting the access data from one of the plurality of systems to the input/output section and discarding the access data from other systems in the case where the access data is synchronous access data.

According to the present invention, there is provided a control program used in a fault tolerant system including a plurality of systems constituted by the same processor section and input/output section, the control program enabling a computer to execute an access control method comprising the steps of: assigning tag information to access data that are transmitted from the processor section to the input/output section, the tag information including: identifying information of the access source and destination; and synchronization information indicating whether the access data is synchronous access data that has been issued when the processor section is in a lock-step synchronous state; separately retaining the access data of the own system and other system that are transmitted from the processor section; determining whether the access data is synchronous access data based on the tag information assigned to the access data in the buffer means; and outputting the access data from one of the plurality of systems to the input/output section and discarding the access data from other systems in the case where the access data is synchronous access data.

According to the present invention, it is possible to realize access processing performed in accordance with synchronous/asynchronous state between processors in a fault tolerant system.

BRIEF DESCRIPTION OF THE DRAWINGS

In the accompanying drawings:

FIG. 6 is a view for explaining setting example of source ID code with CPU synchronization information in the tag assigned to an access packet in the embodiment; and FIG. 7 is a flowchart schematically showing processing performed in the access comparison section of the FT controller in the embodiment.

DETAILED DESCRIPTION OF THE PREFERRED EMBODIMENTS

A preferred embodiment of a fault tolerant system and controller, access control method, and control program used in the fault tolerant system according to the present invention will be described below in detail with reference to the accompanying drawings.

Figure 1:
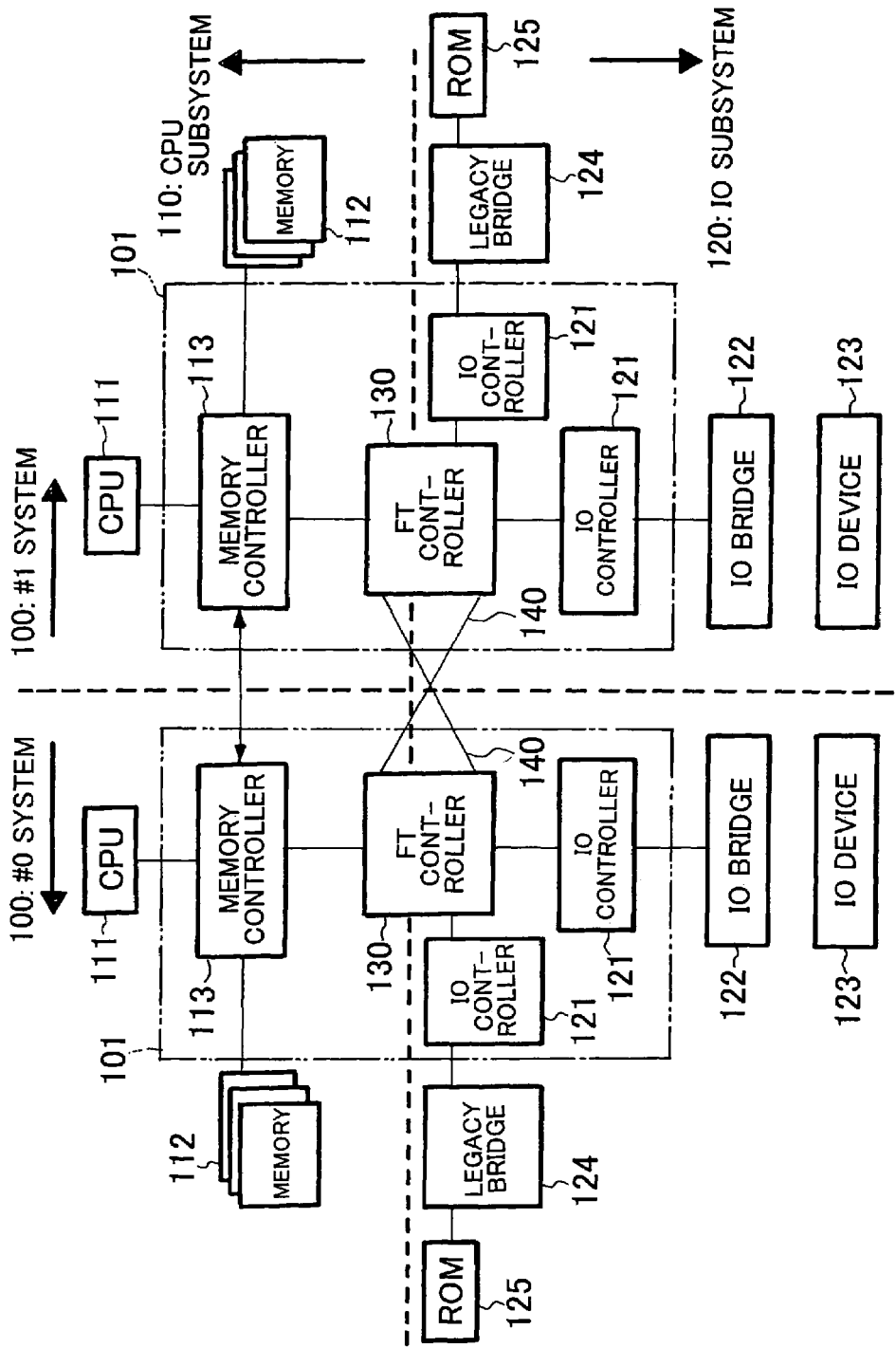
FIG. 1 is a block diagram schematically showing an entire configuration of a fault tolerant system according to an embodiment of the present invention.

FIG. 1 shows a basic configuration of the fault tolerant system according to the embodiment.

The fault tolerant system (also referred to as "fault tolerant computers" or "fault tolerant servers") shown in FIG. 1 is a multiplexed computer system including a plurality of systems constituted by the same computer hardware configuration. Here, the fault tolerant system adopts a duplicated computer system and includes two systems 100 and 100, that is, "#0 system" and "#1 system". In the example of FIG. 1, #0 system and #1 system independent from each other constitute a single fault tolerant system. In the following description, when one (for example, #0 system) of the two systems 100 and 100 is referred to as "own system", the other (for example, #1 system) is as "other system".

As shown in FIG. 1, each of the systems 100 and 100 includes a CPU subsystem 110 serving as a processor section, IO (Input Output) subsystem 120 serving as an input/output section, an FT (Fault Tolerant) controller 130 to be connected to the CPU subsystem 110 and IO subsystem 120, crosslinks 140 and 140 that connect the CPU subsystem 110 of own system and IO subsystem 120 of other system. In the embodiment, the FT controller 130 is mounted as a board controller 101 in the fault tolerant system together with various controllers (memory controller 113 and IO controller 121 to be described later) in the CPU subsystem 110 and IO subsystem 120.

The CPU subsystem 110 and IO subsystem 120 of own system are accessible from each other through the FT controller 130. Further, the CPU subsystem 110 of own system and IO subsystem 120 of other system are accessible from each other through the FT controller 130 of own system, crosslink 140, and FT controller 130 of other system.

The CPU subsystem 110 includes a CPU 111, a memory 112 serving as a main memory of the CPU 111, and a memory controller 113 connected between the CPU 111 and memory 112 through a CPU bus. The CPU subsystems 110 and 110 of own system and other system are connected to each other through the memory controllers 113 and 113.

The CPU subsystems 110 and 110 of own system and other system perform the same operation at the same timing in lock-step synchronization. When one CPU subsystem 110 that is providing a service is separated from the other due to detection of hardware failure, the other CPU subsystem 110 that performs the same operation continues providing the service without interruption.

The IO subsystem 120 has a redundant configuration between the systems 100 and 100. This redundancy is provided by mirroring processing made through software that is executed by the CPU 111 of the CPU subsystem 110. In the example of FIG. 1, the IO subsystem 120 has a plurality (two, in FIG. 1) of IO controllers 121 and 121 for connecting the CPU 111 and an IO device 126, and a DMA/shared resource controller (not shown) for duplicating the CPU subsystems 110 and 110 between own system and other system. The DMA/shared resource controller includes: a DMA (Direct Memory Access) controller (not shown) for copying the contents of the main memory areas of the memories 112 and 112; a shared memory for sharing information between the systems 100 and 100; and a shared resource controller having an intersystem communications function.

An IO device 123 such as a not shown hard disk drive (HDD) is connected to one of the two IO controllers 121 and 121 through an IO bridge 122. A ROM 125 is connected to the other IO controller 121 through a legacy IO bridge 124. The IO controllers 121 and 121 are accessible from the CPU subsystem 110 of own system and the CPU subsystem 110 of other system. As the IO bridge 123, an interface bridge such as PCI (Peripheral Component Interconnect) bus, USB (Universal Serial bus), or IEEE (Institute of Electrical and Electronic Engineers) 1394 can be exemplified. As the legacy IO bridge 124, an interface bridge such as PS (Personal System)/2 port or RS-232C (Recommended Standard 232 version C) port can be exemplified.

The principle of access control for realizing the fault tolerance according to the embodiment will be described.

This embodiment relates to access control from the CPU 111 to IO device 123 in the fault tolerance system. The system has the redundant CPUs configuration in which the CPUs 111 and 111 operates at the same timing while establishing lock-step synchronization. In the system, the IO device 123 is shared between the redundant CPUs 111 and 111 of the systems 100 and 100. When lock-step synchronization is established, the accesses from the CPUs 111 and 111 to the IO device 123 are the same between them, which is equivalent to the access from one CPU 111.

Figure 2:
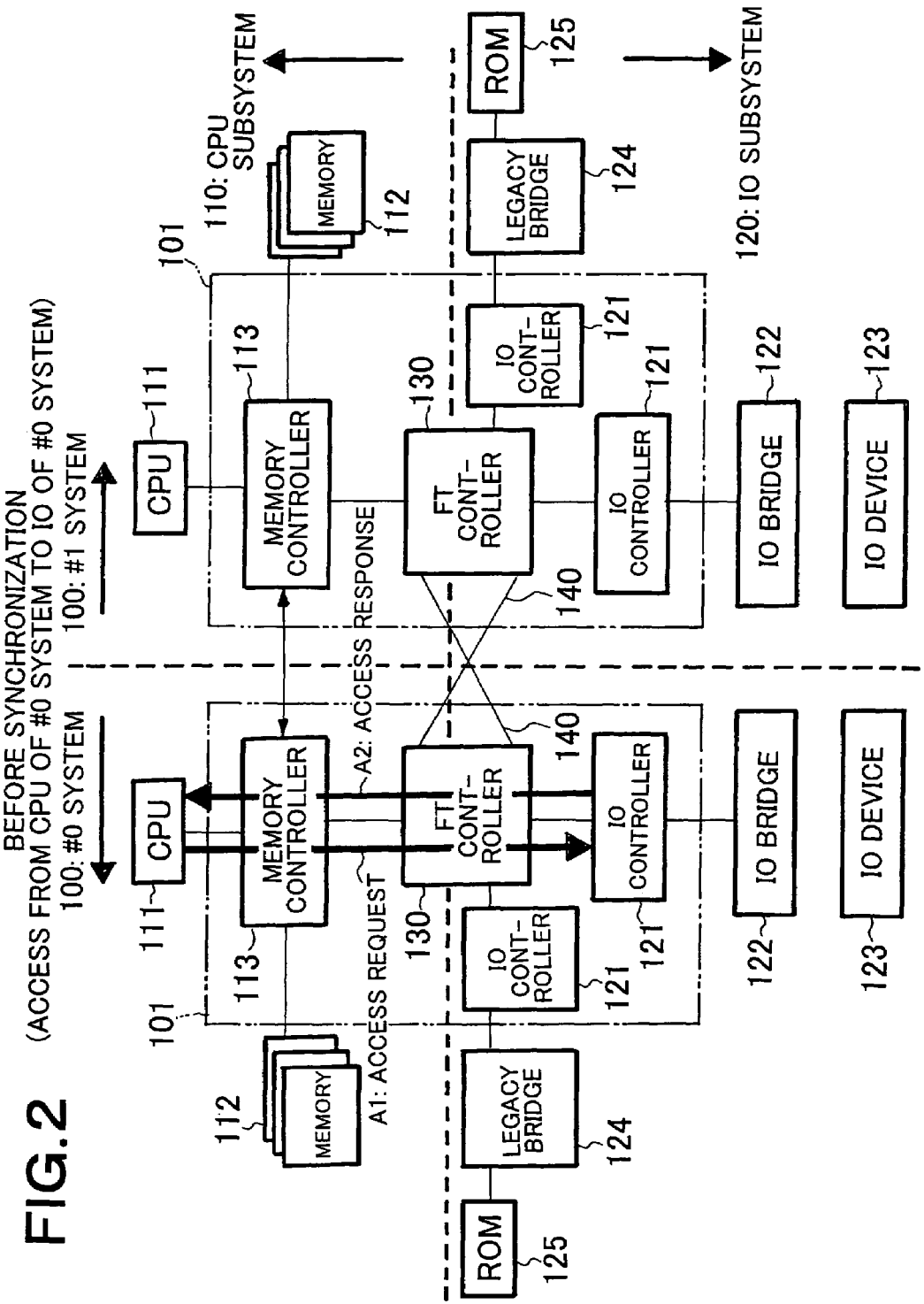
FIG. 2 is a view for explaining access operation made from a CPU of #0 system to an IO device of #0 system before lock-step synchronization in the embodiment.
Figure 3:
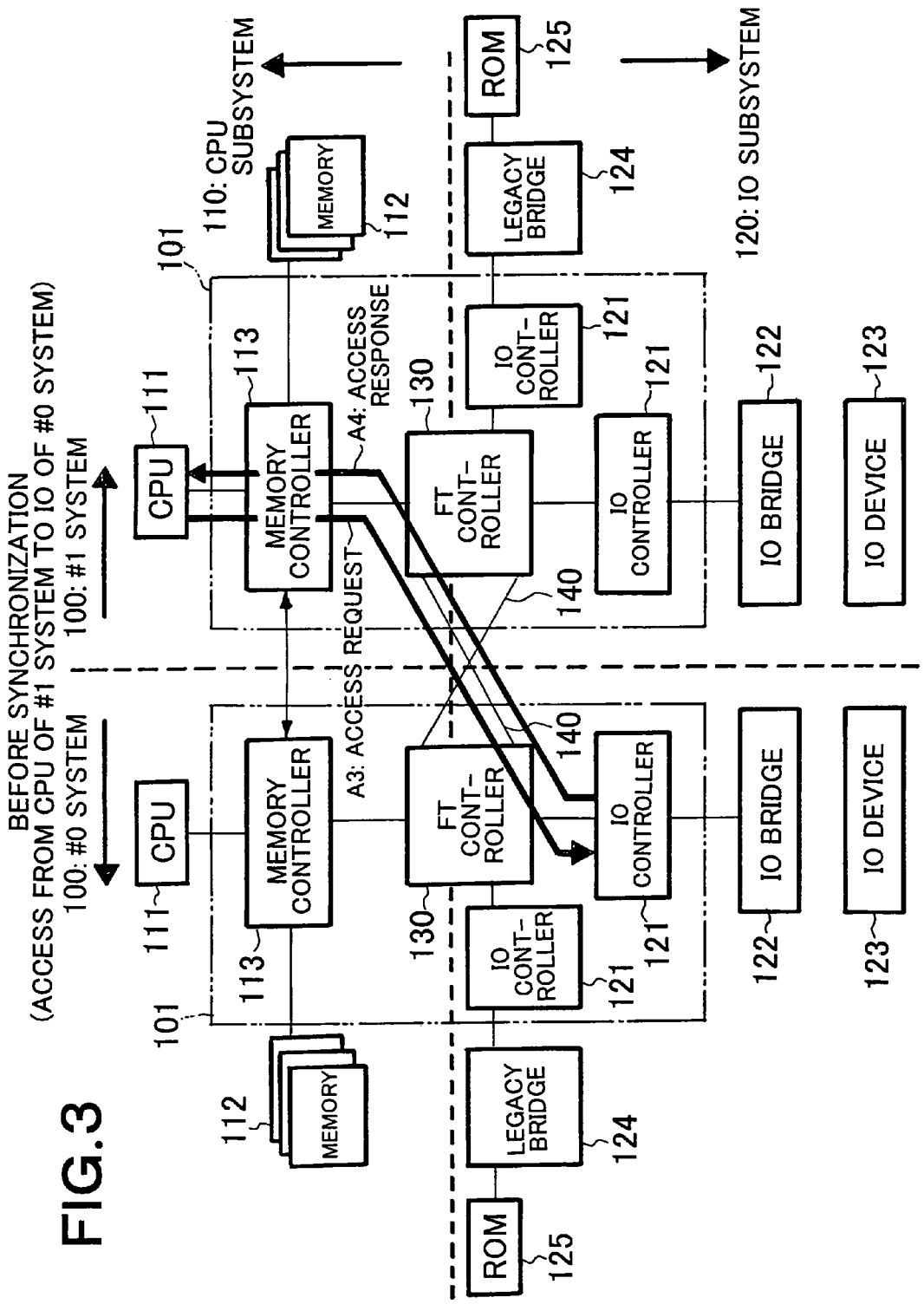
FIG. 3 is a view for explaining access operation made from a CPU of #1 system to the IO device of #0 system before lock-step synchronization in the embodiment.
Figure 4:
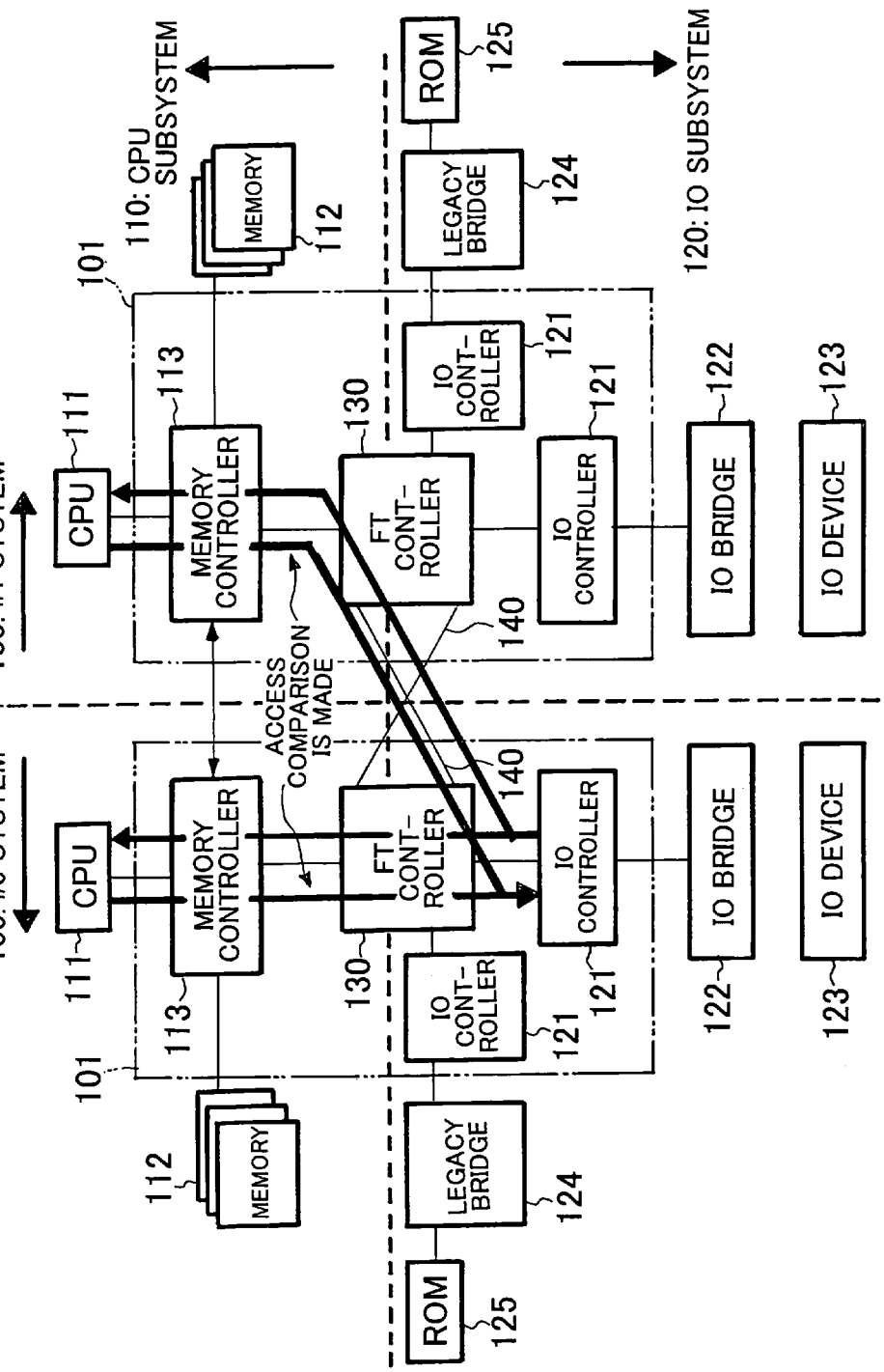
FIG. 4 is a view for explaining access operation during lock-step synchronization is established in the embodiment.

FIG. 2 is a view for explaining access operation made from the CPU 111 of #0 system to the IO device 123 of #0 system before lock-step synchronization. FIG. 3 is a view for explaining access operation made from the CPU 111 of #1 system to the IO device 123 of #0 system before lock-step synchronization. FIG. 4 is a view for explaining access operation during lock-step synchronization is established.

In a state where lock-step synchronization is not established, as shown in FIGS. 2 and 3, when the CPU 111 accesses the IO device 123, the CPUs 111 for redundancy perform operations entirely different from each other, so that the IO device 123 returns access responses A2 and A5 with different contents or at different timings in response to access requests A1 and A3 from the CPUs 111.

On the other hand, when lock-step synchronization has been established as shown in FIG. 4, the access requests from the CPUs 111 to the IO device 123 are regarded as a single access request and, in response to the single access request, a single access response needs to be returned from the IO device 123 to all the CPUs 111.

That is, according to the migration event occurring when the operation mode is switched from asynchronous state to lock-step synchronous state in the fault tolerant system, the accesses from all the CPUs 111, which have been processed individually, need to be processed as a single access. Further, in comparison processing for the access from the CPUs 111 in the fault tolerant system, a comparison between outputs from the CPUs 111 must be performed only when the accesses from the CPUs 111 needs to be processed as a single access.

In order to realize access processing performed in accordance with synchronous/asynchronous state between CPUs 111 as described above, not only source and destination ID tags, but also a tag for determining whether the CPUs 111 was in a synchronous state or asynchronous state at the time point when the access was issued is added to respective access packets. In this case, a synchronous state is determined based on state information managed by the systems 100 and 100.

Figure 5:
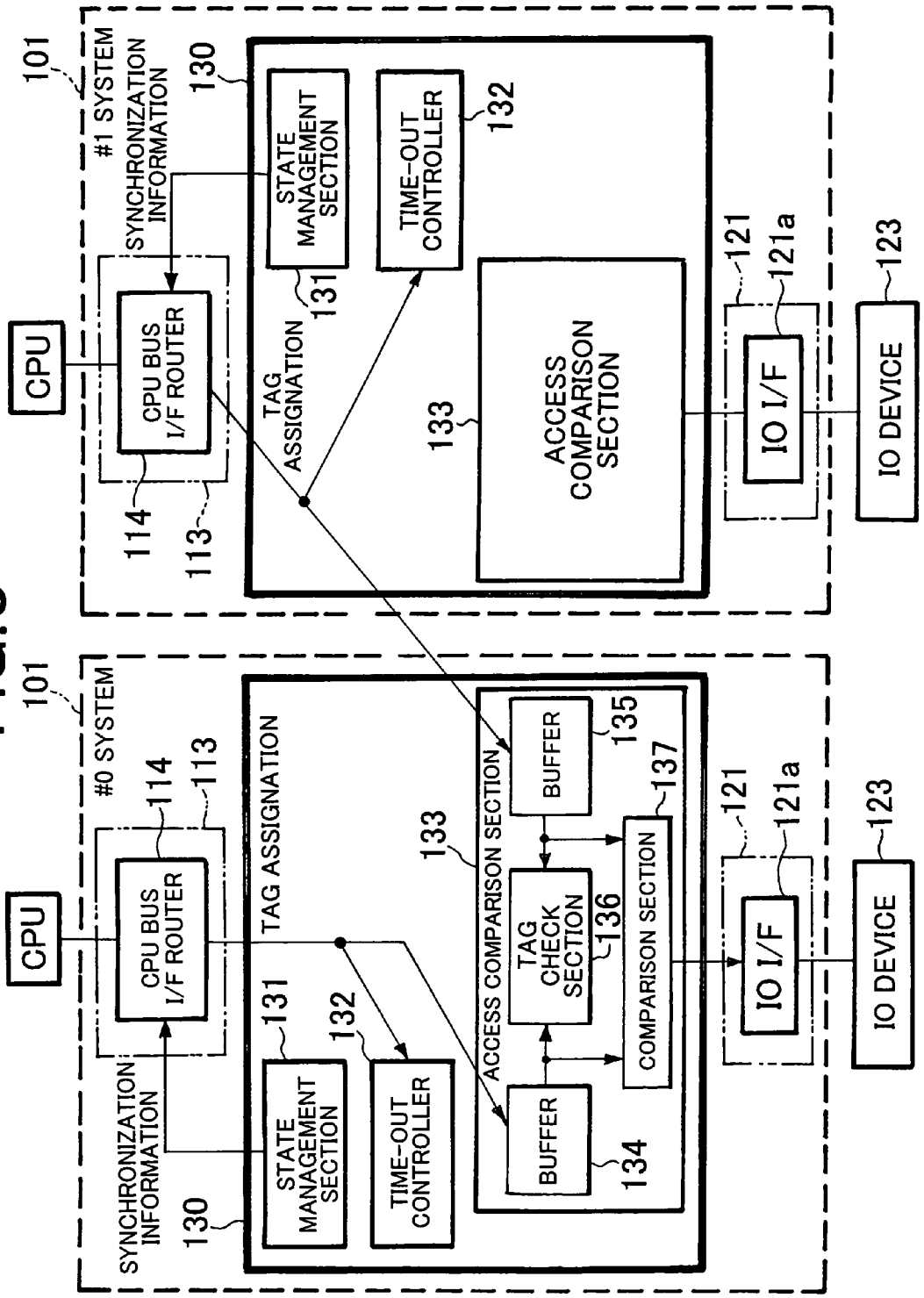
FIG. 5 is a block diagram showing a configuration of the main part of the fault tolerant system according to the embodiment of the present invention in the embodiment.

FIG. 5 shows a configuration of the main part of the fault tolerant system for performing the above mentioned access control.

The fault tolerant system shown in FIG. 5 functionally has: a tag assigning means of the present invention and a CPU bus I/F (interface) router (hereinafter, referred to as merely "router") 114 having a function of executing processing steps corresponding to the tag assigning means in the memory controller 113; a synchronization determination means, processing means, and respective sections having functions of executing processing steps corresponding to the determination means and processing means, that is, a state management section 131, a time-out controller 132, and an access comparison section 133 in the FT controller 130; and an IO I/F 121a in the IO controller 121.

The router 114 routes an access packet accessed among the CPU bus I/F in the CPU subsystem 110, main memory area of the memory 112, and external IO device 123. Further, when the access packet requests a response such as a read request, the router 114 assigns tag information specifying a response destination to the respective access packets.

The access comparison section 133 has: a buffer 134 that temporarily stores the access packet that is transmitted from the CPU 111 of own system through the router 114; a buffer 135 that temporarily stores the access packet that is transmitted from the CPU 111 of other system through the router 114; a tag check section 136 that checks tag information assigned to the access packets temporarily stored in the buffers 134 and 135 to determine whether each access packet indicates a synchronous access that was issued in a synchronous state between the CPUs 111 and 111 or indicates an asynchronous access that was issued in an asynchronous state between the CPUs 111 and 111; and a comparison section 137 that compares the access packets in the buffers 134 and 135 to perform an error detection.

When the access packets that the tag check section 136 has determined as the synchronous access agree with each other in the comparison result, the comparison section 137 regards an access from one system 100 as a redundant access and discards it and outputs an access from the other system 100 to the IO I/F 121a. When the access packets do not agree with each other in the comparison result, the comparison section 137 leaves an access from one system 100 that has previously been determined as a more reliable system based on operation history information (for example, information indicating whether the system is one (control system, active system) providing a service or one (standby system) in standby state and operation history based on the above information) retained in the system 100 and regards an access from the other system 100 as a redundant packet and discards it.

When an access is discarded due to disagreement in the access comparison result or when there is no packet to be returned to the CPU 111 as a response due to occurrence of a failure in the IO device 123, the time-out controller 132 performs an abort response to the access using a timer function after a predetermined time has elapsed.

The state management section 131 manages synchronization state information of the system, access availability information between the CPU 111 and IO device 123, connection/disconnection information of the system, and reliability information of the system.

The IO I/F 121a functions as an interface between the system 100 and external IO device 123 and controls input/output of access packets.

The operation of the present embodiment will next be described.

An access packet destined to the IO device 123 is input to the CPU bus I/F router 114 from the CPU 111. At this time, state information including the synchronization state information of the CPU 111 output from the state management section 131 is also input to the CPU bus I/F router 114.

Subsequently, in the CPU bus I/F router 114, a tag is assigned to the access packet from the CPU 111. The tag includes ID (identification) information for identifying the access end point of the packet, that is, the source of the packet, ID information for identifying the destination of the packet, as well as the synchronization state information of the CPU 111 output from the state management section 131.

In the present embodiment, a combination of the synchronization information of the CPU 111 and ID information of the source (access end point) of the packet is used. That is, a tag to be assigned when the CPU 111 of #0 system and CPU 111 of #1 system make accesses apparently has the same source ID code between the CPUs 111 in a synchronous state and has individual source ID codes between the CPUs 111 in an asynchronous state.

FIG. 6 is a setting example of source ID code with CPU synchronization information in the tag information assigned to an access packet. In the example of FIG. 6, the CPUs 111 of #0 system and #1 system have source ID=Sync CPU, respectively during synchronization is established; on the other hand, the CPUs 111 of #0 system and #1 system have source ID=CPU 0 and source ID=CPU 1, respectively during synchronization is not established.

The access packet to which such source ID code with CPU synchronization information has been assigned is input to the access comparison section 133 in the FT controller 130.

FIG. 7 is a flowchart showing the processing performed in the access comparison section 133.

When receiving an access packet from the CPU bus I/F router 114 (step S1), the access comparison section 133 once retains the access packet in the buffers 134 and 135 located in front of the comparison section 137, allows the tag check section 136 to check tag information of the retained access packet to thereby determines whether the tag information indicates synchronous access or asynchronous access (step S2).

In the case of asynchronous access, the access comparison section 133 does not perform comparison and outputs the access packet to the IO I/F 121a (step S7).

In the case of synchronous access, the access comparison section 133 checks whether the corresponding access packet from the CPU 111 of other system has reached or not (step S3). If the access packet corresponding to synchronous access has not reached (No in step S3), waits for the access packet for a given time using a timer in the time-out controller 132 (No in step S5). In the case the corresponding packets are assembled within a given time (Yes in step S3), the comparison section 137 compares the access packets (step S4). Based on the comparison result, the comparison section 137 regards one access packet as a redundant packet and discards it and outputs the other access packet to the IO I/F 121a (steps S6, S7).

If both access packets agree with each other, the comparison section 137 regards the access from one system 100 as a redundant access and discards it and outputs the access from the other system 100 to the IO I/F 121a. If both access packets do not agree with each other, the comparison section 137 leaves the access packet from one system 100 that has previously been determined as a more reliable system based on operation history information retained in the system 100 for output and regards the access from the other system 100 as a redundant packet and discards it.

If the access packets corresponding to synchronous access have not been assembled within a given time and time-out occurs in steps S3 and S5 (No in step S3, Yes in step S5), the access comparison section 133 does not perform processing (access packet comparison) of step S4 but shifts to steps S6 and S7.

When receiving the access packet output in step S7, the IO I/F 121a returns the source ID code of the access packet as a response of the received access. As a result, the access response is transmitted through the FT controller 130, the routers 113 and 113 of the systems 100 and 100, to the CPUs 111 and 111.

Thus, according to the present embodiment, the accesses made from the CPUs 111 and 111 can be processed as individual accesses in the case where a synchronous state is not established between the CPUs 111 and 111; on the other hand, the accesses made from the CPUs 111 and 111 can be processed as a single access in the case where a synchronous state is established between the CPUs 111 and 111. As a result, access processing can be performed in accordance with synchronous/asynchronous state between the CPUs 111 and 111 in a fault tolerant system.

In the present embodiment, the router 114 is provided in the memory controller 113, the state management section 131, time-out controller 132, and access comparison section 133 are provided in the FT controller 130, and the IO I/F 121a is provided in the IO controller 121. However, this is just a functional configuration and any configuration can be adopted as long as it can achieve the same function. For example, the above functional components may be provided in one controller.

Further, a duplicated computer system is exemplified as the fault tolerant system in the above embodiment. Alternatively, however, the present invention can be applied also to a triplicated or more multiplexed computer system.

What is claimed is:

1. A fault tolerant system including a plurality of systems constituted by the same computer hardware components, each of the systems comprising:
    a processor section that can operate in a lock-step synchronous state between own system and other system;
    an input/output section to be connected to the processor section;
    a controller to be connected between the processor section and input/output section; and
    a signal transmission path that connects the own system and other system through the controller,
    the controller comprising:
    tag assignation means for assigning tag information to access data that are transmitted from the processor section to the input/output section, the tag information including:
    identifying information of the access source and destination; and synchronization information indicating whether the access data is synchronous access data that has been issued when the processor section is in a lock-step synchronous state;
    buffer means for separately retaining the access data of the own system and other system that are transmitted from the processor section;
    synchronization determination means for determining whether the access data is synchronous access data based on the tag information assigned to the access data in the buffer means; and
    processing means for outputting the access data from one of the plurality of systems to the input/output section and discarding the access data from other systems in the case where the access data is synchronous access data.

2. The fault tolerant system according to claim 1, wherein the synchronization information is combined with the identifying information of the access source, and is set such that the identifying information of the access source of the own system apparently becomes the same as the identifying information of the access source of the other system when the access data is synchronous access data, whereas the identifying information of the access source of the own system and other system are individually set when the access data is not synchronous access data.

3. A controller device used in a fault tolerant system including a plurality of systems constituted by the same processor section and input/output section, the controller comprising a computer-readable medium having computer code comprising:

tag assignation means for assigning tag information to access data that are transmitted from the processor section to the input/output section, the tag information including:

identifying information of the access source and destination; and synchronization information indicating whether the access data is synchronous access data that has been issued when the processor section is in a lock-step synchronous state;

buffer means for separately retaining the access data of own system and other system that are transmitted from the processor section;

synchronization determination means for determining whether the access data is synchronous access data based on the tag information assigned to the access data in the buffer means; and processing means for outputting the access data from one of the plurality of systems to the input/output section and discarding the access data from other systems in the case where the access data is synchronous access data.

4. The controller device according to claim 3, wherein the synchronization information is combined with the identifying information of the access source, and is set such that the identifying information of the access source of the own system apparently becomes the same as the identifying information of the access source of the other system when the access data is synchronous access data, whereas the identifying information of the access source of the own system and the other system are individually set when the access data is not synchronous access data.

5. An access control method used in a fault tolerant system including a plurality of systems constituted by the same processor section and input/output section, the access control method comprising the steps of:

assigning tag information to access data that are transmitted from the processor section to the input/output section, the tag information including: identifying information of the access source and destination; and synchronization information indicating whether the access data is synchronous access data that has been issued when the processor section is in a lock-step synchronous state;

separately retaining the access data of own system and other system that are transmitted from the processor section;

determining whether the access data is synchronous access data based on the tag information assigned to the access data; and outputting the access data from one of the plurality of systems to the input/output section and discarding the access data from other systems in the case where the access data is synchronous access data.

6. The access control method according to claim 5, wherein the synchronization information is combined with the identifying information of the access source, and is set such that the identifying information of the access source of the own system apparently becomes the same as the identifying information of the access source of the other system when the access data is synchronous access data, whereas the identifying information of the access source of the own system and other system are individually set when the access data is not synchronous access data.

7. A computer-readable medium having a control program used in a fault tolerant system including a plurality of systems constituted by the same processor section and input/output section, the control program enabling a computer to execute an access control method comprising the steps of:

assigning tag information to access data that are transmitted from the processor section to the input/output section, the tag information including: identifying information of the access source and destination; and synchronization information indicating whether the access data is synchronous access data that has been issued when the processor section is in a lock-step synchronous state;

separately retaining the access data of own system and other system that are transmitted from the processor section;

determining whether the access data is synchronous access data based on the tag information assigned to the access data; and outputting the access data from one of the plurality of systems to the input/output section and discarding the access data from other systems in the case where the access data is synchronous access data.

8. The computer-readable medium according to claim 7, wherein the synchronization information is combined with the identifying information of the access source, and is set such that the identifying information of the access source of the own system apparently becomes the same as the identifying information of the access source of the other system when the access data is synchronous access data, whereas the identifying information of the access source of the own system and the other system are individually set when the access data is not synchronous access data.

* * * * *